United States Patent
Camps Mur et al.

(10) Patent No.: US 8,819,688 B2
(45) Date of Patent: Aug. 26, 2014

(54) METHOD AND SYSTEM FOR SCHEDULING PERIODIC PROCESSES

(75) Inventors: Daniel Camps Mur, Heidelberg (DE); Xavier Perez Costa, Heidelberg (DE)

(73) Assignee: NEC Europe Ltd., Heidelberg (DE)

( * ) Notice: Subject to any disclaimer, the term of this patent is extended or adjusted under 35 U.S.C. 154(b) by 684 days.

(21) Appl. No.: 13/061,228

(22) PCT Filed: Aug. 27, 2009

(86) PCT No.: PCT/EP2009/006215
§ 371 (c)(1),
(2), (4) Date: Feb. 28, 2011

(87) PCT Pub. No.: WO2010/022945
PCT Pub. Date: Mar. 4, 2010

(65) Prior Publication Data
US 2011/0209152 A1    Aug. 25, 2011

(30) Foreign Application Priority Data

Aug. 28, 2008  (EP) .................................. 08015186

(51) Int. Cl.
  *G06F 9/46*  (2006.01)
  *G06F 9/48*  (2006.01)
(52) U.S. Cl.
  CPC .................................. *G06F 9/4887* (2013.01)
  USPC ........................................ 718/102; 718/100
(58) Field of Classification Search
  None
  See application file for complete search history.

(56) References Cited

U.S. PATENT DOCUMENTS

| 5,944,778 A * | 8/1999 | Takeuchi et al. ............... 718/100 |
| 6,012,080 A * | 1/2000 | Ozden et al. .................... 718/102 |
| 7,502,358 B1 * | 3/2009 | Kopikare et al. ................ 370/346 |
| 7,712,099 B2 * | 5/2010 | Vargas et al. .................... 718/102 |
| 7,725,896 B2 * | 5/2010 | Pham .................................. 718/102 |
| 2005/0034126 A1 * | 2/2005 | Moore ............................. 718/100 |
| 2007/0047482 A1 | 3/2007 | Costa et al. |
| 2007/0288928 A1 * | 12/2007 | Chen ................................ 718/102 |
| 2011/0161963 A1 * | 6/2011 | Guevorkian et al. ............ 718/102 |

FOREIGN PATENT DOCUMENTS

| CN | 1921350 A | 2/2007 |
| JP | 2000322278 A | 11/2000 |
| JP | 2007060637 A | 3/2007 |

OTHER PUBLICATIONS

X. Perez-Costa, et al., "Overlapping Aware Scheduled Automatic Power Save Delivery Algorithm", in European Wireless 2007, Section 3, Apr. 1, 2007, pp. 108, Paris, France.

(Continued)

*Primary Examiner* — Abdullah Al Kawsar
*Assistant Examiner* — Tammy Lee
(74) *Attorney, Agent, or Firm* — Young & Thompson

(57) ABSTRACT

A method of scheduling periodic processes for execution in an electronic system, in particular in a network, in a data processor or in a communication device, wherein the electronic system includes a controller for performing the scheduling, wherein a number of N processes $P_i$ are already scheduled with each process $P_i$ having an individual service interval $SI_i$, and wherein an additional process $P_{N+1}$ is to be scheduled with a service interval $SI_{N+1}$, is characterized in that the additional process $P_{N+1}$ is scheduled in such a way that the minimum time lag between the execution times of the additional process $P_{N+1}$ and the execution times of the number of N already scheduled processes $P_i$ is maximized. Furthermore, a corresponding device for scheduling periodic processes for execution in an electronic system is disclosed.

14 Claims, 5 Drawing Sheets

(56) References Cited

OTHER PUBLICATIONS

Goossens J., "Scheduling of Hard Real-Time Periodic Systems with Various Kinds of Deadline and Offset Constraints", Jan. 1, 1998, pp. I-VIII, 01, p. 195-p. 240.

John P. Lehoczky: "Fixed Priority Scheduling of Periodic Task Sets with Arbitrary Deadlines", Proceedings of the Real Time Systems Symposium. Lake Buena Vista, Dec. 5-7, 1990, Washington, IEEE. Comp. Soc. Press. US, vol. Symp. 11, Dec. 5, 1990, pp. 201-209.

International Search Report, dated Dec. 2, 2010, from corresponding PCT application.

Chinese Office Action, from corresponding CN application.

Japanese Office Action, dated Aug. 15, 2012, from corresponding JP application.

\* cited by examiner

METHOD AND SYSTEM FOR SCHEDULING PERIODIC PROCESSES

The present invention relates to a method of scheduling periodic processes for execution in an electronic system, in particular in a network, in a data processor or in a communication device, wherein said electronic system includes a controller for performing said scheduling, wherein a number of N processes $P_i$ are already scheduled with each process $P_i$ having an individual service interval $SI_i$, and wherein an additional process $P_{N+1}$ is to be scheduled with a service interval $SI_{N+1}$.

Furthermore, the present invention relates to a system for scheduling periodic processes for execution in an electronic system, in particular in a network, in a data processor or in a communication device, said system comprising a controller that is scheduling a number of N processes $P_i$ with each process $P_i$ having an individual service interval $SI_i$ and that is configured to schedule an additional process $P_{N+1}$ with a service interval $SI_{N+1}$.

Scheduling periodic processes is a common problem e.g. in computer science and networking. For instance, periodic processes can represent traffic generated by multimedia codecs (like Voice or Video) or jobs to be periodically executed in a real-time operating system. In particular if a high number of processes try to access a shared resource, e.g. a CPU in real-time systems, or the wireless medium in wireless scheduling, scheduling plays a decisive role as for ensuring that all processes can meet their deadlines. Furthermore, in a system with strict QoS guarantees a high number of processes that have to be executed may cause, if not properly scheduled, a high peak load observed by the network/system and may thereby decrease the network/system capacity.

It is also a common situation when dealing with periodic task sets that a scheduler entity that is responsible for scheduling the tasks can determine the initial scheduling time for each task. A problem opens up in this case that is how to determine the optimum starting time for each task to be scheduled in the system. Solutions have been proposed in the literature to handle this problem, for instance in: X. Perez-Costa, et al., "*Overlapping Aware Scheduled Automatic Power Save Delivery Algorithm*", in European Wireless 2007, Section 3, or in: J. Goossens, "*Scheduling of offset free systems*", in Journal of Real-Time Systems (2001). However, solutions existing so far are either non-optimal because they will rely on heuristics or are computationally expensive because they require the exploration of the LCM (Least Common Multiple) of the different processes' service intervals (i.e. their periods), which can grow exponentially, or they explore a set of candidate initial start times whose size can also grow exponentially.

For clarity in illustrating this problem it may be helpful to consider how the LCM of the processes' periods can exponentially grow depending on the service intervals of the different processes. Considering a set of processes with integer periods multiple of 10 time units with a minimum value of 10 time units and maximum value of 100, 200 or 300 time units, the value of the LCM of the processes' periods can grow like:

LCM(10, 20, . . . , 100)=25200
LCM(10, 20, . . . , 200)=2.38·10$^9$
LCM(10, 20, . . . , 300)=2.39·10$^{13}$.

It is therefore an object of the present invention to improve and further develop a method and a system of the initially described type in such a way that, by employing mechanisms that are readily to implement, a reduction in the peak capacity that has to be considered in admission control and a reduction in delay and jitter is achieved. Furthermore, the number of processes that can be scheduled in the system shall be increased and power saving shall be improved.

In accordance with the invention the aforementioned object is accomplished by a method comprising the features of claim 1. According to this claim such a method is characterized in that said additional process $P_{N+1}$ is scheduled in such a way that the minimum time lag between the execution times of said additional process $P_{N+1}$ and the execution times of said number of N already scheduled processes $P_i$ is maximized.

Furthermore, the aforementioned object is accomplished by a system wherein the controller is further configured to schedule said additional process $P_{N+1}$ in such a way that the minimum time lag between the execution times of said additional process $P_{N+1}$ and the execution times of said number of N already scheduled processes $P_i$ is maximized.

According to the invention it has first been recognized that in many application scenarios best performance can be achieved when the execution times of several periodic processes are spread as far as possible. To this end the present invention proposes to schedule an additional process in such a way that the minimum time lag between the execution times of the additional process and the execution times of the already scheduled processes is maximized.

Maximizing the time lag between the execution times of different processes is beneficial in many environments for a variety of reasons. For instance, in a real-time operative system it minimizes the chance that different processes try to access a shared resource, e.g. a CPU or the wireless medium in wireless scheduling, at the same time. This behavior improves the capacity of the system, since the chance that all processes can meet their deadlines is increased. Maximizing the time distance between release times of different processes also reduces the peak rate observed by the network, which is beneficial e.g. with respect to provide strict QoS guarantees.

Applied to a networking system where a terminal turns to an energy saving doze mode between the execution times of its periodic processes, the present invention minimizes the chances that when the terminal awakes it must wait while the terminal's serving base station is delivering traffic to another terminal. Thereby the terminal's battery life can be significantly increased.

The proposed method outperforms existing prior art solutions in terms of time and space complexity because of two main reasons. First, the complexity of the present solution does not depend on the LCM (Least Common Multiple) of the different processes' service intervals which results in a significant speed up in scheduling time. Second, the proposed method does not need to define a subset of candidate offset values, which can grow exponentially with the number of processes, but directly obtains the optimum offset value.

It is to be noted that the assumption that a number of N processes are already scheduled does in no way limit the present invention and, besides the cases of N being a relatively large number, also includes for instance the case of N=0 or N=1. In particular, cases are covered in which several process requesting to be scheduled arrive at the controller all at the same time, or in which processes are already available in the system at t<0, or in which requests arrive at the controller at different times.

The process to be scheduled may be a task, a flow or an operation. Generally, the processes to be scheduled may include many different types of processes, like for example, but not limited to, jobs to be periodically executed in a real time system, periodic traffic generated by multimedia codecs, frequency spread-spectrum, comb-filtered RF transmissions, start times of (synchronized) video downloads in a network, bus-access-times of multiprocessors in a distributed CPU, merging of automobile traffic streams in computer-controlled highways of the future, etc.

In case several processes arrive concurrently at the controller, an algorithm may be provided that orders said processes for sequential scheduling according to predefined policies. For instance, the policies may take into consideration deadlines of the processes that have to be met to fulfill QoS guarantees. In such case, processes with strict deadlines could be scheduled prior to processes with more flexible deadlines.

At each scheduling stage the minimum time lag between the execution times of a currently scheduled process $P_{N+1}$ and the execution times of said number of N already scheduled processes $P_i$ may be maximized by assigning an appropriate initial execution time $t_{ie}$ to the process being currently scheduled. According to a preferred embodiment, the initial execution time $t_{ie}$ of a process $P_{N+1}$ to be scheduled may be determined by way of breaking the N-flows problem into a number of N different 2-flow problems that consider the process to be currently scheduled and each of the already scheduled processes. Such approach enormously reduces the complexity of the problem to be solved and thus results in a considerable reduction of the computational resources in terms of time, power and capacity needed for the scheduling process. According to a specific embodiment, the N-flows problem may be broken into a number of N different 2-flow problems by calculating the minimum time lag between the execution times of the process $P_{N+1}$ to be currently scheduled and the execution times of the number of N already scheduled processes $P_i$.

The minimum time lag between the execution times of the process $P_{N+1}$ to be currently scheduled and the execution times of said number of N already scheduled processes $P_i$ may be expressed as a function of the initial execution time $t_{ie}$ to be assigned to said process $P_{N+1}$ to be currently scheduled. For instance, the minimum time lag could be defined as follows:

$$d_{min} = \phi_i \bmod gcd(SI_i, SI_{N+1})$$

Alternatively, if different processes had different durations, the minimum time lag can be re-defined as:

$$d_{min} = \phi_i \bmod gcd(SI_i, SI_{N+1}) - duration_i$$

In a next step, a concept of an "absolute minimum time lag" may be introduced. The absolute minimum time lag may be defined as the minimum of all the individual minimum time lags between the process $P_{N+1}$ to be currently scheduled and each of the number of N already scheduled processes $P_i$. It is to be noted that the absolute minimum time lag is bounded and is periodic since all involved processes are periodic. Advantageously, the absolute minimum time lag is maximized by computing the period T of the function that represents the absolute minimum distance as a function of the initial execution time $t_{ie}$ of the process $P_{N+1}$ to be currently scheduled.

Specifically, the period T of the absolute minimum time lag may be computed by calculating the Greatest Common Divisors (GCD) of the service interval $SI_{N+1}$ of the process $P_{N+1}$ to be currently scheduled with each of the service intervals $SI_i$ of the number of N already scheduled processes $P_i$, $$gcd(SI_i, SI_{N+1}), \text{ for } i=1, \ldots, N.$$

From all values thus obtained, the LCM can be computed in order to obtain the period $$T = lcm(gcd(SI_1, SI_{N+1}), \ldots, gcd(SI_N, SI_{N+1})).$$

The complexity is enormously reduced and bounded by $T < SI_{N+1}$. For example, considering a set of processes with integer periods multiple of 10 time units, and with a minimum value of $SI_{min}=10$ time units and a maximum value of $SI_{max}=300$ time units, state of the art search operations require lcm $(10, 20, \ldots, 300)=2.39 \cdot 10^{13}$ operations, whereas the proposed method requires just 300 passes.

Advantageously, the absolute minimum time lag is expressed as a function of the initial execution time $t_{ie}$. Then, according to a preferred embodiment, for each number of N already scheduled processes $P_i$ all zeros of above mentioned function contained within the period T will be generated. The absolute minimum time lag can be defined upon the function's zeros, because before and after each zero it decreases and increases with unitary slope. Therefore the absolute minimum time lag is a set of triangular shapes of unitary slope and different heights.

According to a preferred embodiment a list of the zeros will be generated that contains the zeros in a sorted order. In a next step, within the list of sorted zeros the highest gap between two consecutive elements may be located. Advantageously, the center of the largest gap is selected as the initial execution time $t_{ie}$. It is to be noted that being the absolute minimum distance a train of triangular shapes of unitary slope between consecutive zeros, the maximum of such function is located in the middle of the two consecutive zeros having the highest gap between them.

According to preferred embodiments the method and the system according to the present invention can be generalized, in particular, to frequency intervals, to spatial intervals, or to timing intervals.

For instance, DE 10 2005 040 027 A1, the entire disclosure of which is incorporated herein by way of reference, describes a method for controlling the communication with mobile stations over a wireless network, wherein the scheduling mechanism according to the present invention can be applied for determining the service starting times.

BRIEF DESCRIPTION OF THE DRAWINGS

In connection with the explanation of the preferred examples of embodiments of the invention by the aid of drawings, generally preferred embodiments and further developments of the teaching will be explained. In the drawings.

DETAILED DESCRIPTION OF THE INVENTION

Figure 1:
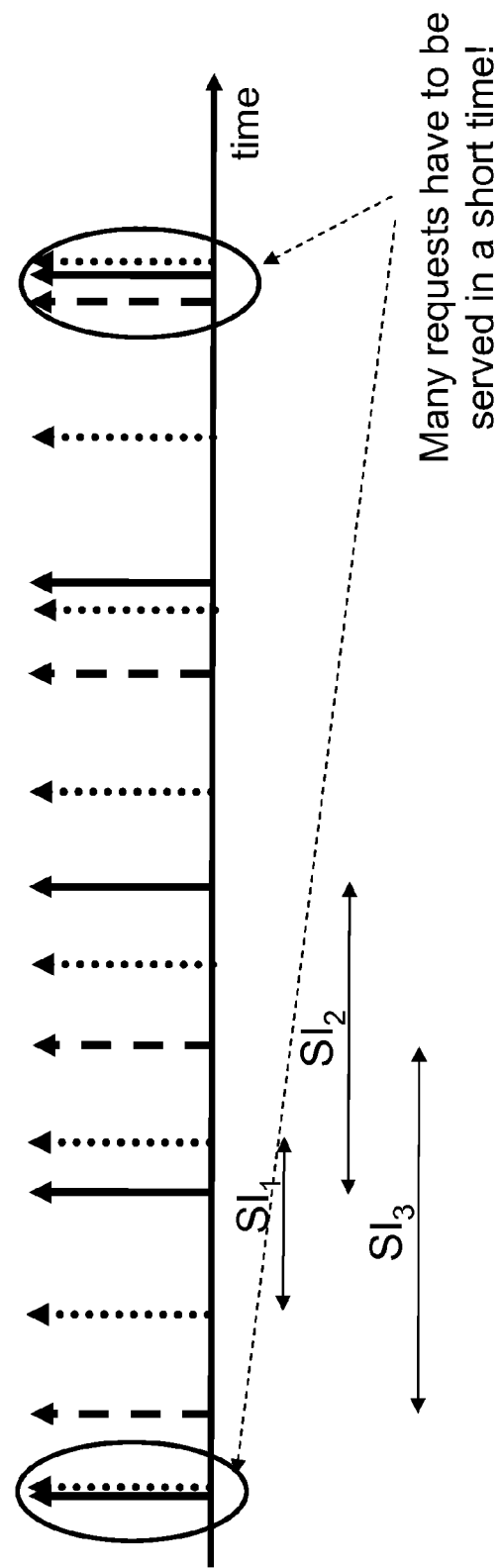
FIG. 1 illustrates schematically a set of three periodic processes for execution in an electronic system.

FIG. 1 illustrates schematically a set of three periodic processes for execution in an electronic system. Each of the processes has a different service interval ($SI_1$, $SI_2$, $SI_3$) and a different starting time, wherein the starting times are assumed to be set randomly. As can be obtained from FIG. 1, there are certain times at which the execution times of two or even all three processes quasi overlap. In a case, in which the system is not able to execute all three processes at the same time (e.g. due to limited available resources), at least one of the processes has to wait until the other process/processes is/are completely executed, or one of the processes has to be dropped if queuing is not possible.

This behavior might result in that not all processes will meet their deadlines. In real time operative systems this will cause an increase in the peak load observed by the CPU and hence decrease the capacity of the system. Considering a WLAN system based on polling where stations are sleeping between polls, power consumption will increase, when a station awakes and must wait while the base station is serving traffic to another station. If the processes illustrated in FIG. 1 represent flows that carry bursty traffic a delay will be introduced in one stream due to the burstiness of another stream.

Figure 2:
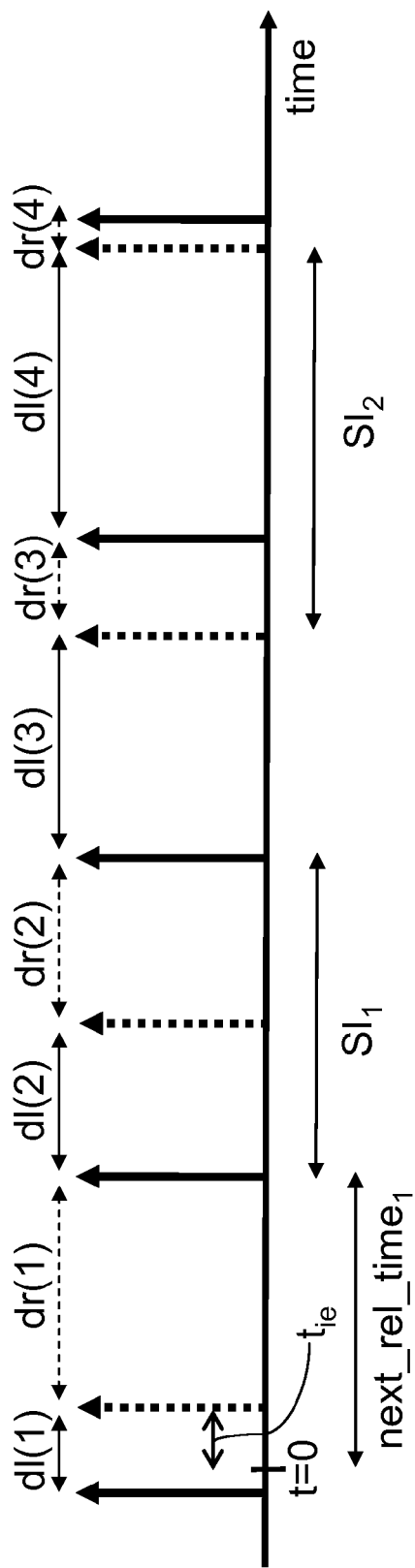
FIG. 2 illustrates schematically an aspect of a scheduling procedure for two periodic processes according to a first embodiment of the method according to the invention.

FIG. 2 illustrates schematically an aspect of a scheduling procedure for two periodic processes according to a first embodiment of the method according to the invention. More specifically, FIG. 2 represents two different periodic flows that have to be scheduled. The first flow—flow 1—is indicated by the solid line arrows and the second flow—flow 2—is indicated by the dotted line arrows. It is assumed that flow 1 with service interval $SI_1$ is already scheduled with certain execution times. The regular instants where this flow is scheduled are referred to as the release times of this flow. At a certain point in time, that without lack of generality is considered to be t=0, new flow 2 requests to be scheduled in the system with a service interval denoted by $SI_2$.

The left distances between flow 2 and flow 1 are defined as the time differences between a release time of flow 2 and the last release time of flow 1, denoted as dl (k). Similarly the right distances are defined as the time differences between a release time of flow 2 and the next release time of flow 1, denoted as dr (k). Both dl (k) and dr (k) are depicted in FIG. 2. Further, FIG. 2 depicts next_ref_time$_1$, being a variable defined from t=0 that contains the next release time of flow 1.

In order to find an optimal initial execution time (denoted $t_{ie}$) of flow 2, which maximizes the minimum distance between the release times of flows 1 and 2, it can be noticed that dl (k) and dr (k) can be expressed as:

$$dl(k) = (dl(0) + kSI_2) \bmod SI_1$$

$$dr(k) = SI_1 - dl(k)$$

where dl (0) is the initial left distance taken as reference.

In a next step the minimum value of dl (k) and dr (k) will be expressed as a function of the selected $t_{ie}$. Since flows 1 and 2 are periodic, the situation in the channel is periodic with period T=lcm ($SI_1$, $SI_2$). Thus, dl (k) and dr (k) are also periodic of period N=T/$SI_2$.

By employing the linear congruence theorem, it can be proved that:

$$dl_{min} = dl(0) \bmod gcd(SI_1, SI_2),$$

$$dr_{min} = gcd(SI_1, SI_2) - dl_{min},$$

A simple transformation can be used to define the minimum left and right distances as a function of the selected $t_{ie}$. If flow 2 is granted a $t_i$, that equals next_rel_time, the minimum left distance will be zero, hence:

$$dl_{min} = (t_{ie} - \phi) \bmod gcd(SI_1, SI_2),$$

$$dr_{min} = gcd(SI_1, SI_2) - dl_{min},$$

where $\phi$ is an initial shift defined as $\phi$=next_rel_time$_1$ mod gcd($SI_1$, $SI_2$).

Figure 3:
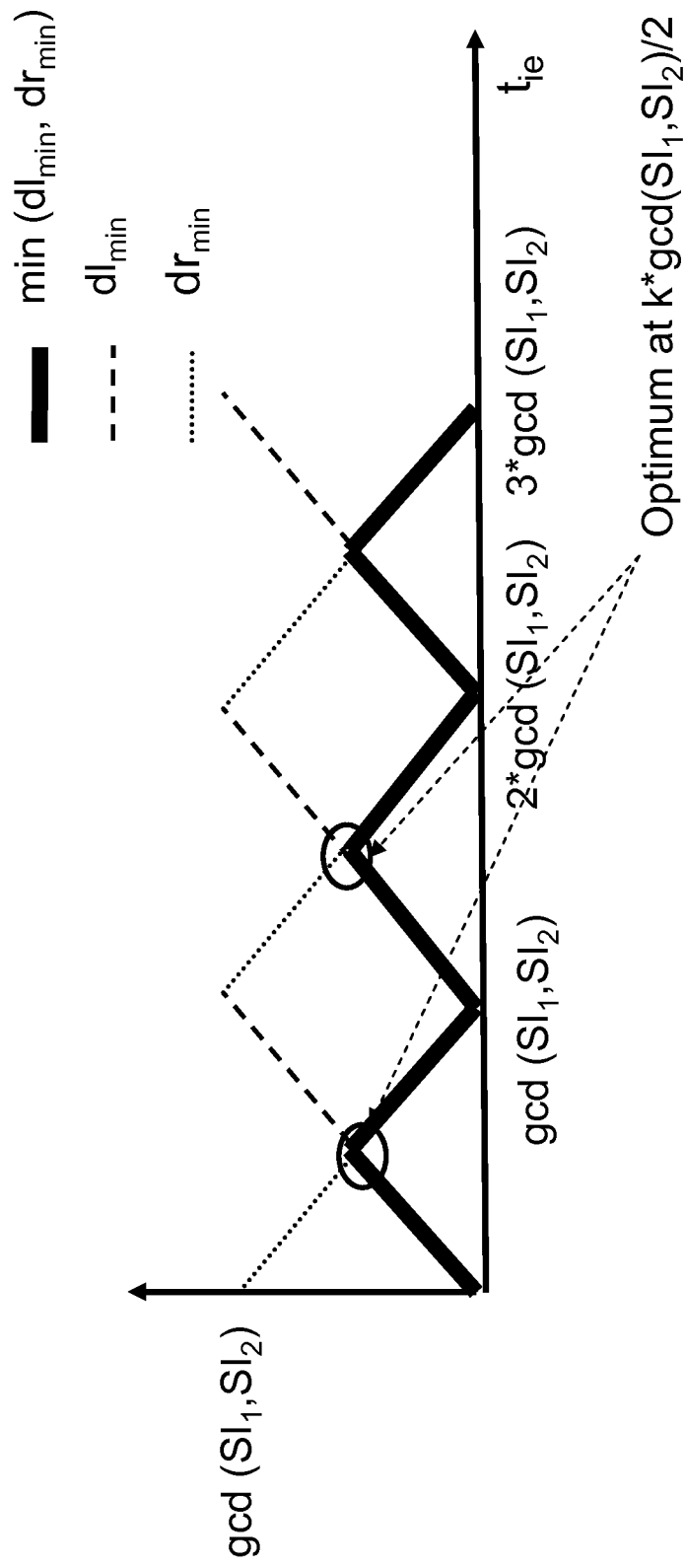
FIG. 3 illustrates schematically another aspect of the scheduling procedure of FIG. 2.

FIG. 3 schematically illustrates further steps of the scheduling process of FIG. 2. More specifically, FIG. 3 plots the minimum values of dl (k) and dr (k) as a function of the selected $t_{ie}$ according to the explanations in FIG. 2. As can be easily obtained from FIG. 3, the maximum value of both minimum distances equals gcd ($SI_1$, $SI_2$) and occurs when $$t_{ie} = \phi + k \cdot gcd(SI_1, SI_2), k \geq 1.$$

Both minimum distances though are never maximized at the same time.

Considering again FIG. 3, the overall minimum distance, i.e. min {$dl_{min}$, $dr_{min}$}, appears to be a set of consecutive triangular shapes of unitary slope. Therefore, the value of $t_{ie}$ that maximizes the minimum distances between any two release times of flow 1 and flow 2 is:

$$t_{ie} = \phi + k \cdot (gcd(SI_1, SI_2)/2).$$

The maximum minimum separation that can be achieved between any two periodical flows is hence gcd ($SI_1$, $SI_2$)/2.

Figure 4:
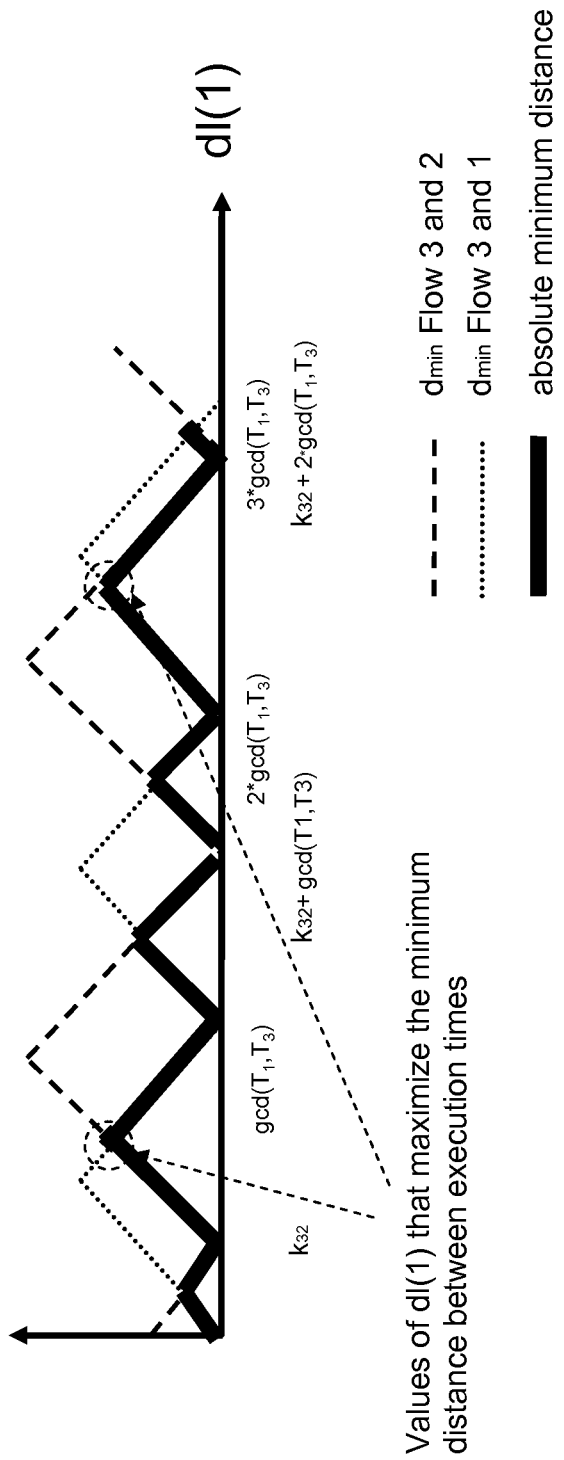
FIG. 4 illustrates schematically a scheduling procedure for three periodic processes according to a second embodiment of the method according to the invention.

Whereas the foregoing embodiment described in connection with FIGS. 2 and 3 with only 2 flows was mainly intended to illustrate the basic principles of the present invention, FIG. 4 schematically illustrates an embodiment with a total of 3 flows that can easily be generalized to an N flow case with N>3.

In the following a scenario is assumed in which N periodic flows are already scheduled in a system with service intervals $SI_i$, i=1 . . . N, and a new flow requires to be scheduled with service interval $SI_{N+1}$. Here again the goal is to find the initial execution time $t_{ie}$ for the new flow that maximizes the minimum distance between its release times and the release times of the flows already scheduled.

Leveraging the results from the 2-flow case as described in connection with FIGS. 2 and 3, it is possible to break the N-flows problem into N different 2-flow problems that consider the new flow and each of the already scheduled flows. Defining as before the left and right distances of the new flow (N+1) with each of the already scheduled flows (i, i=1 . . . N), it can be derived that:

$$dl_{min(N+1,i)} = (t_{ie} - \phi_{N+1,i}) \bmod gcd(SI_i, SI_{N+1})$$

$$dr_{min(N+1,i)} = gcd(SI_i, SI_{N+1}) - dl_{min(N+1,i)},$$

where $\phi_{N+1,i}$ is an initial shift defined as $\phi_{N+1,i}$=next_rel_time (i)mod gcd ($SI_{N+1}$, $SI_i$).

FIG. 4 represents the minimum left and right distances in a system where two flows were already scheduled and a new flow has requested access. In the figure $dl_{min(N+1,i)}$ and $dr_{min(N+1,i)}$ are not depicted separately but instead min {$dl_{min(N+1,i)}$, $dr_{min(N+1,i)}$} is directly plotted for each scheduled flow.

In case of having N flows, the minimum distance for each possible $t_{ie}$ will correspond to the minimum among all min {$dl_{min(N+1,i)}$, $dr_{min(N+1,i)}$} distances. This distance is denoted as the absolute minimum distance. Thus, a fast method that finds the maximum of the absolute minimum distance can be defined based on the following observations:

The absolute minimum distance is periodic in $t_{ie}$ with period T'=lcm (gcd ($SI_i$, $SI_{N+1}$), . . . , gcd ($SI_N$, $SI_{N+1}$)).

Each of the individual minimum distances, i.e. min {$dl_{min(N+1,i)}$, $dr_{min(N+1,i)}$}, contain zeros at $t_{ie}$=$\phi_{N+1,i}$+ k·gcd ($SI_i$, $SI_{N+1}$), k≥1. All zeros belong to the absolute minimum distance.

The absolute minimum distance can be defined upon its zeros, because before and after each zero it decreases and increases with unitary slope. Therefore the absolute minimum distance is a set of triangular shapes of unitary slope and different heights.

Figure 5:
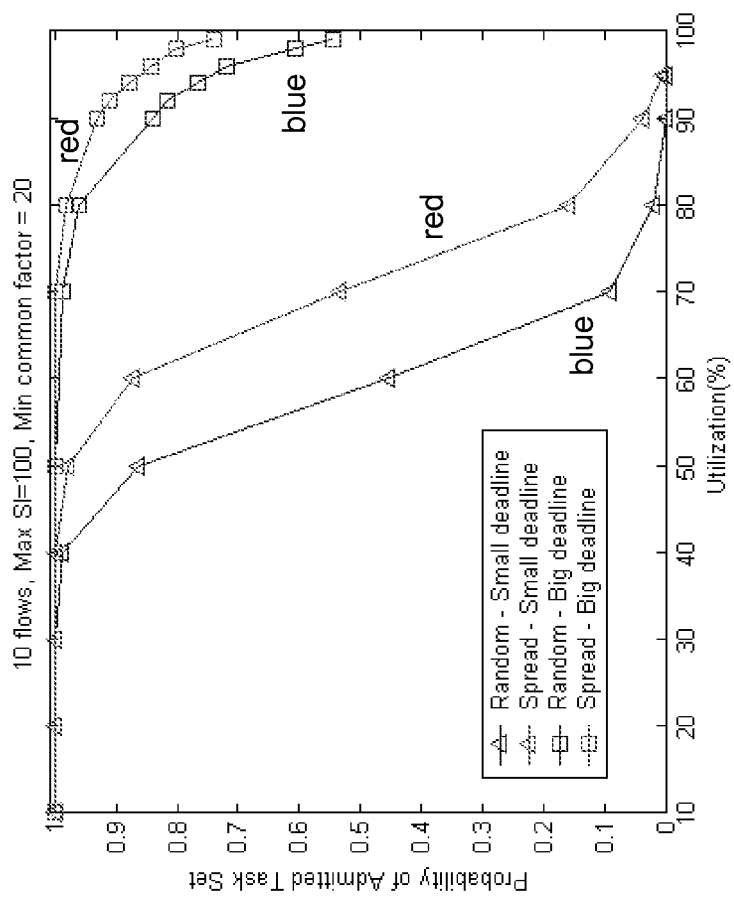
FIG. 5 illustrates the capacity of an Admission Control test in a real time operative system.

Finally, a method to find the optimum $t_{ie}$ can be designed based on the following observation:

Being the absolute minimum distance a train of triangular shapes of unitary slope between consecutive zeros, the maximum of such function is located in the middle of the two consecutive zeros having the highest gap between them. A method that locates the $t_{ie}$ that maximizes the absolute minimum distance function can be described in the following way:

1. Compute gcd $(SI_{N+1}, SI_N)$ for all the N already scheduled flows.
2. Compute the period of the absolute minimum distance, $T'=\text{lcm} (\gcd (SI_i, SI_{N+1}), \ldots, \gcd (SI_N, SI_{N+1}))$.
3. For each already scheduled flow generate all zeros at $\phi_{N+1,i}+k\cdot\gcd (SI_i, SI_{N+1})$ contained within T'.
4. Sort the list of zeros.
5. Locate within the list of sorted zeros the highest gap between two consecutive elements FIG. 5 illustrates the capacity of an Admission Control test in a real time operative system as mentioned before in connection with FIG. 4. Given a set of tasks an Admission Control test decides on whether the delay constraints can be fulfilled. FIG. 5 illustrates the percentage of task sets that can be admitted in a system with hard QoS guarantees if the initial times of each task are spreaded pursuant to the method according to the present invention (red lines) or if the initial times of each task are randomly assigned (blue lines).

As can be seen in FIG. 5 maximizing the distance between the release times of the different flows reduces the peak capacity that has to be considered in admission control and hence significantly increases the number of tasks that can be scheduled in the system.

To summarize, the main features of the method according to the present invention compared to existing prior art solutions are:

The achieved offset assignment is optimal in the sense that the minimum distance between release times of different tasks/flows is maximized.

The proposed method outperforms the solutions in the state of the art in terms of time and space complexity because of two main reasons:
  i) The complexity of the invented method does not depend on the LCM of the different tasks' periods which results in a significant speed up in scheduling time.
  ii) The proposed method does not need to define a subset of candidate offset values, which can grow exponentially with the number of processes to be scheduled, but directly obtains the optimum offset value $t_{ie}$.

The actual advantages of the proposed method depend on the particular environment where it is being applied. Some examples are:

Capacity: In real-time systems a task can only be scheduled if it is guaranteed that its delay bound will never be violated. Admission Control tests exist for these systems that decide on, given a set of tasks, whether the delay constraints can be fulfilled. Maximizing the distance between the release times of the different flows reduces the peak capacity that has to be considered in admission control and hence increases the number of tasks that can be scheduled in the system.

Speed: Since admission control tests are usually computationally expensive it is very important to have fast methods to schedule the starting times of the different tasks in an optimum way. Another example of the same kind are Integrated Services networks implementing Guaranteed Service.

Delay/jitter: In a communication system where periodic VBR (variable bit rate) flows have to be provided certain delay guarantees, scheduling these flows too close to each other can result in the burst of one flow delaying the traffic for other flows. Maximizing the distance between the schedule times of VBR flows minimizes the effect of one flow over the rest, hence reducing jitter. In technologies where this scheduling has to be done on-line fast methods are critical.

Power Saving: In a communication system where stations running VBR flows are in power saving and only get up to receive/transmit their data at the scheduled time, maximizing the distance between flows increases the power saving.

The present invention can be applied in any of the areas where scheduling of real-time periodic tasks/flows is used, particularly (but not limited to) periodic/real-time multimedia packet streams. Some examples are:

any networking technology supporting centralized QoS and hence dealing with the scheduling of real time multimedia codecs, e.g:
  1. The UGS (Unsolicited Grant Services) class of service in WiMAX Base Stations can be scheduled according to the proposed method to reduce the number of flows accessing in the same WiMAX frame.
  2. The HCCA mode of the 802.11e standard is based on the periodic scheduling of flows and therefore the proposed method can be used.

development of real-time operative systems, e.g. RT Linux, VxWorks, RT-11, eCos, industrial Control and Automation applications, e.g., control of automobile engine parameters, and polling of on-board systems, robotics, embedded systems (programmable thermostats, household appliance controllers, etc.).

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. Method of scheduling periodic processes for execution in an electronic system, including in a network, in a data processor, or in a communication device, wherein said electronic system includes a controller for performing said scheduling, wherein a number of N processes $P_i$ are already scheduled with each process $P_i$ having an individual service interval $SI_i$, and wherein an additional process $P_{N+1}$ is to be scheduled with a service interval $SI_{N+1}$, said method comprising the steps of scheduling, at each of plural scheduling stages, said additional process $P_{N+1}$ to maximize a minimum time lag between the execution times of said additional process $P_{N+1}$ being currently scheduled and the execution times of said number of N already scheduled processes $P_i$ by assigning an appropriate initial execution time $t_{ie}$ to said additional process $P_{N+1}$ being currently scheduled, wherein said controller calculates the minimum time lag between the execution times of said additional process $P_{N+1}$ to be currently scheduled and the execution times of each of said number of N already scheduled processes $P_i$, and expresses each calculated minimum time lag as a function of said initial execution time $t_{ie}$ to be assigned to said additional process $P_{N+1}$, and wherein a minimum of all individual minimum time lags between said additional process $P_{N+1}$ to be currently scheduled and each of said number of N already scheduled processes $P_i$ defines an absolute minimum time lag which is maximized by computing a period T of a function that represents the absolute minimum time lag as a function of the initial execution time $t_{ie}$ of the additional process $P_{N+1}$ to be currently scheduled, and wherein said initial execution time $t_{ie}$ of said additional process $P_{N+1}$ to be scheduled is determined by way of breaking an N-flows problem into a number of N different 2-flow problems.

2. Method according to claim 1, wherein said process is a task, a flow or an operation.

3. Method according to claim 2, wherein, when plural processes arrive concurrently at said controller, an algorithm is provided that orders said processes for sequential scheduling according to predefined policies.

4. Method according to claim 1, wherein, in case several processes arrive concurrently at said controller, an algorithm is provided that orders said processes for sequential scheduling according to predefined policies.

5. Method according to claim 1, wherein the N-flows problem is broken into a number of N different 2-flow problems by calculating the minimum time lag between the execution times of said additional process $P_{N+1}$ to be currently scheduled and the execution times of said number of N already scheduled processes $P_i$.

6. Method according to claim 5, wherein said minimum time lag between the execution times of said additional process $P_{N+1}$ to be currently scheduled and the execution times of said number of N already scheduled processes $P_i$ is expressed as a function of said initial execution time $t_{ie}$ to be assigned to said additional process $P_{N+1}$ to be currently scheduled.

7. Method according to claim 1, wherein the scheduling mechanism is applied to frequency intervals, to spatial intervals, or to timing intervals.

8. Method of scheduling periodic processes for execution in an electronic system, including in a network, in a data processor, or in a communication device, wherein said electronic system includes a controller for performing said scheduling, wherein a number of N processes $P_i$ are already scheduled with each process $P_i$ having an individual service interval $SI_i$, and wherein an additional process $P_{N+1}$ is to be scheduled with a service interval $SI_{N+1}$, said method comprising the steps of scheduling, at each of plural scheduling stages, said additional process $P_{N+1}$ to maximize a minimum time lag between the execution times of said additional process $P_{N+1}$ being currently scheduled and the execution times of said number of N already scheduled processes $P_i$ by assigning an appropriate initial execution time $t_{ie}$ to said additional process $P_{N+1}$ being currently scheduled, wherein said controller calculates the minimum time lag between the execution times of said additional process $P_{N+1}$ to be currently scheduled and the execution times of each of said number of N already scheduled processes $P_i$, and expresses each calculated minimum time lag as a function of said initial execution time $t_{ie}$ to be assigned to said additional process $P_{N+1}$, and wherein a minimum of all individual minimum time lags between said additional process $P_{N+1}$ to be currently scheduled and each of said number of N already scheduled processes $P_i$ defines an absolute minimum time lag which is maximized by computing a period T of a function that represents the absolute minimum time lag as a function of the initial execution time $t_{ie}$ of the additional process $P_{N+1}$ to be currently scheduled, and wherein the period T of the function that represents said absolute minimum time lag is computed as the Least Common Multiple of the Greatest Common Divisors between the service interval $SI_{N+1}$ of said additional process $P_{N+1}$ to be currently scheduled and the service intervals $SI_i$ of each of said number of N already scheduled processes Pi.

9. Method according to claim 8, wherein for each of said number of N already scheduled processes $P_i$ all "zeros", defined as multiples of the Greatest Common Divisor between the service interval $SI_{N+1}$ of said additional process $P_{N+1}$ to be currently scheduled and the service intervals $SI_i$ of each of said number of N already scheduled processes $P_i$, contained within said period T of said absolute minimum distance are generated, wherein each said "zero" of the function of said initial execution time $t_{ie}$ is an input value that produces an output of zero.

10. Method according to claim 9, wherein a list of said "zeros" is generated containing said "zeros" in a sorted order.

11. Method according to claim 10, comprising the step of locating, within said list of sorted "zeros, the largest gap between two consecutive "zeros".

12. Method according to claim 11, wherein the center of said largest gap is selected as said initial execution time $t_{ie}$.

13. Method according to claim 9, wherein for each of said number of N already scheduled processes $P_i$ all "zeros" includes shifted multiples of the Greatest Common Divisor of the Greatest Common Divisor between the service interval $SI_{N+1}$ of said additional process $P_{N+1}$ to be currently scheduled and the service intervals $SI_i$ of each of said number of N already scheduled processes $P_i$, contained within said period T of said absolute minimum distance are generated.

14. A computerized system comprising a computer processor that schedules periodic processes for execution in an electronic system, including in a network, in a data processor or in a communication device, said computerized system comprising a controller that is scheduling a number of N processes $P_i$ with each process $P_i$ having an individual service interval $SI_i$ and that is configured to schedule an additional process $P_{N+1}$ with a service interval $SI_{N+1}$, said controller scheduling, at each of plural scheduling stages, said additional process $P_{N+1}$ to maximize a minimum time lag between the execution times of said additional process $P_{N+1}$ being currently scheduled and the execution times of said number of N already scheduled processes $P_i$ by assigning an appropriate initial execution time $t_{ie}$ to said additional process $P_{N+1}$ being currently scheduled, wherein said controller calculates the minimum time lag between the execution times of said additional process $P_{N+1}$ to be currently scheduled and the execution times of each of said number of N already scheduled processes $P_i$, and expresses each calculated minimum time lag as a function of said initial execution time $t_{ie}$ to be assigned to said additional process $P_{N+1}$, and wherein a minimum of all individual minimum time lags between said additional process $P_{N+1}$ to be currently scheduled and each of said number of N already scheduled processes $P_i$ defines an absolute minimum time lag which is maximized by computing a period T of a function that represents the absolute minimum time lag as a function of the initial execution time $t_{ie}$ of the additional process $P_{N+1}$ to be currently scheduled, and wherein said initial execution time tie of said additional process $P_{N+1}$ to be scheduled is determined by way of breaking an N-flows problem into a number of N different 2-flow problems.

* * * * *